US008321503B2

(12) United States Patent
Endres et al.

(10) Patent No.: US 8,321,503 B2
(45) Date of Patent: Nov. 27, 2012

(54) CONTEXT-SPECIFIC NETWORK RESOURCE ADDRESSING MODEL FOR DISTRIBUTED SERVICES

(75) Inventors: Raymond E. Endres, Seattle, WA (US);
Nishant Gupta, Sammamish, WA (US);
Karthik Raman, Issaquah, WA (US);
Aditya G. Bhandarkar, Redmond, WA (US); Farookh Mohammed, Woodinville, WA (US); Dharma Shukla, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 209 days.

(21) Appl. No.: 12/822,744

(22) Filed: Jun. 24, 2010

(65) Prior Publication Data

US 2011/0320522 A1 Dec. 29, 2011

(51) Int. Cl.
*G06F 15/16* (2006.01)
(52) U.S. Cl. ........ 709/203; 709/225; 709/226; 370/352; 370/449
(58) Field of Classification Search .................. 709/203, 709/225–226; 370/352, 449
See application file for complete search history.

(56) References Cited

U.S. PATENT DOCUMENTS

| | | | |
|---|---|---|---|
| 6,131,095 A | 10/2000 | Low et al. | |
| 6,898,633 B1* | 5/2005 | Lyndersay et al. | 709/226 |
| 7,337,910 B2 | 3/2008 | Cartmell et al. | |
| 7,461,170 B1* | 12/2008 | Taylor et al. | 709/245 |
| 7,516,221 B2* | 4/2009 | Souder et al. | 709/226 |
| 7,650,410 B2* | 1/2010 | Nemoto | 709/225 |
| 7,805,711 B2* | 9/2010 | Sonderegger | 717/140 |
| 7,853,643 B1* | 12/2010 | Martinez et al. | 709/203 |
| 2005/0210136 A1* | 9/2005 | Nemoto | 709/225 |
| 2006/0002377 A1* | 1/2006 | Skog et al. | 370/352 |
| 2006/0064411 A1* | 3/2006 | Gross et al. | 707/3 |
| 2006/0251104 A1* | 11/2006 | Koga | 370/449 |
| 2008/0016151 A1* | 1/2008 | Howard et al. | 709/203 |
| 2008/0082665 A1* | 4/2008 | Dague et al. | 709/226 |
| 2008/0271133 A1* | 10/2008 | Brey et al. | 726/10 |
| 2010/0216477 A1* | 8/2010 | Ryan | 455/449 |
| 2010/0250653 A1* | 9/2010 | Hudgeons et al. | 709/203 |
| 2010/0275109 A1* | 10/2010 | Morrill | 715/205 |
| 2011/0275364 A1* | 11/2011 | Austin et al. | 455/423 |
| 2012/0011196 A1* | 1/2012 | Green et al. | 709/203 |

OTHER PUBLICATIONS

Lee, Jason., "Microsoft SQL Data Services—Under the Hood", Retrieved at http://download.microsoft.com/download/8/b/4/8b4aa374-cbee-4e6b-9f01-c9177204b6e1/Microsoft%20SQL%20Data%20Services%20-%20Under%20the%20Hood.pdf>>, Oct. 2008, pp. 1-14.

(Continued)

*Primary Examiner* — Quang N Nguyen
*Assistant Examiner* — Razu Miah

(57) ABSTRACT

A back-end locator service can be utilized to identify a specific computing device, from among multiple computing devices in a domain, that is the most appropriate computing device to handle a particular type of request for data or other resources. The data or resources hosted by the domain can be divided among multiple computing devices. The domain can expose a network-based application program interface where successive requests by a client computing device become more specific as to the data or resources requested. Responses from the computing devices in the domain can, at some point in time, be informed by the back-end locator service and can comprise location-specific resource identifiers. The client computing device can utilize such location specific resource identifiers to direct further communications to the appropriate, specific computing device without having to incur redirection inefficiencies.

14 Claims, 4 Drawing Sheets

OTHER PUBLICATIONS

Zhao, et al., "DotSlash: Handling Web Hotspots at Dynamic Content Web Sites", Retrieved at http://citeseerx.ist.psu.edu/viewdoc/download?doi=10.1.1.93.6644&rep=rep1&type=pdf >>, INFOCOM, 25th IEEE International Conference on Computer Communications, Joint Conference of the IEEE Computer and Communications Societies, Apr. 23-29, 2006, pp. 6.

"A Superior Global Redirection Solution for Multiple Data Center Environments", Retrieved at http://www.exclusivenetworks.com/downloads/be/documentations/1DE0E75C-3E15-42A6-9812-17C3637FFC0A.pdf>>, Feb. 2007, pp. 1-11.

Velpula, Ravi., "Hyper-V Clustering—Basic Facts", Retrieved at http://blogs.rnsdn.com/rkvelpula/default.aspx>>, Sep. 25, 2009, pp. 4.

Hamilton, James., "James Hamilton's Blog", Retrieved at http://perspectives.mvdirona.com/default,date,2008-09-06.aspx>>, Sep. 6, 2008, pp. 19.

"ZXTM Global Load Balancer User Guide", Retrieved at http://knowledgehub.zeus.com/media/GLB2.0/zxtm-glb-manual-2.0.pdf>>, Software Version 2.0, Retrieved Date: Mar. 23, 2010, pp. 1-28.

* cited by examiner

CONTEXT-SPECIFIC NETWORK RESOURCE ADDRESSING MODEL FOR DISTRIBUTED SERVICES

BACKGROUND

Traditionally, a computing device that is requesting some data over a network typically assumes that the computing device to which it has directed such a request comprises the requested data. If such a computing device does not comprise the requested data, existing solutions are limited to either redirecting the requesting computing device, and thereby causing the requesting computing device to resend its request to the computing device to which it was redirected, or, alternatively, fetching such data from another computing device and then providing it to the requesting computing device. Each case provides inefficiencies. A redirection causes the requesting computing device to have to re-issue the same request, now to a different, destination, computing device, while acquiring the data from another computing device adds an additional set of network communications. Of course, a third option, which does not provide success as far as actually accessing the requested data, can be to simply inform the requesting computing device that the requested data is not available from the computing device that received the request.

In many network environments, such a third option can be commonly utilized, since such network environments can be based on a more rigorously defined set of resources. However, in large-scale, multiparty, distributed networks, such as the ubiquitous Internet and World Wide Web (WWW), widespread usage of such an option could result in a large number of users being unable to access certain data when the location of such data was moved, or the data was otherwise reorganized. Instead, in large-scale, multi-party, distributed networks the former two options can be more desirable. For example, web pages on the WWW can, and often do, redirect a user's web browser to a more appropriate web page. Typically, such redirection can occur when the data of one web page has been moved to a different web page, or other location on the network. In such a case, the original location can simply redirect the user's browser to the new location, thereby causing the browser to issue the same request, again, except now to the new web page, or other resource at the new location. As another example, many websites on the WWW can, and often do, provide for back-end processes that can go and obtain the data requested by the user, irrespective of the actual location of that data, and then return such data to the requesting user. While the requests from the user's computing device are technically not redirected, inefficiency is still introduced by the additional set of network communications performed by such back-end processes to go and obtain the requested data from whatever location in which such data now resides.

As the resources, especially programmatic resources, that can be available over a network increase, the inefficiencies of existing redirection schemes, such as those enumerated above, become more noticeable and generate a greater impact on performance. For example, when a user uses a web browser in a typical web browsing session comprising retrieving mostly static data from network sources, the few redirections that a user may encounter during such a typical web browsing session may not substantially impact the user's experience. Indeed, for a typical user, the ability to ultimately obtain the requested data is of paramount importance, and the additional delay introduced by any redirection mechanisms can be minimal, especially within the scope of the overall browsing experience. However, for computer-executable instructions executing on a computing device that utilize network-based resources as a type of application program interface, such that those computer-executable instructions are continuously requesting data over the network from other networked computing devices as part of the very essence of the execution of those computer-executable instructions, efficiency of data access over the network can become of paramount importance.

SUMMARY

In one embodiment, a back-end locator service can provide location-specific network addresses such that data can be partitioned across multiple computing devices communicationally coupled to the network and the back-end locator service can provide the location-specific network address of the computing device most appropriate for the requested data.

In another embodiment, a network-based application program interface can be created such that initial requests can be location agnostic, while subsequent requests can become more specific and, via the back-end locator service, can be directed to the appropriate locations merely as part of the back-and-forth communications inherent in such a network-based application program interface and, thereby, without introducing any additional delay, repetition, or other such redirection inefficiencies.

In a further embodiment, the data and service documents that can be exposed through a network-based application program interface can be hierarchically defined to enable subsequent requests to become more specific and, via the back-end locator service, be directed to the appropriate locations again as part of the back-and-forth communications inherent in such a network-based application program interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
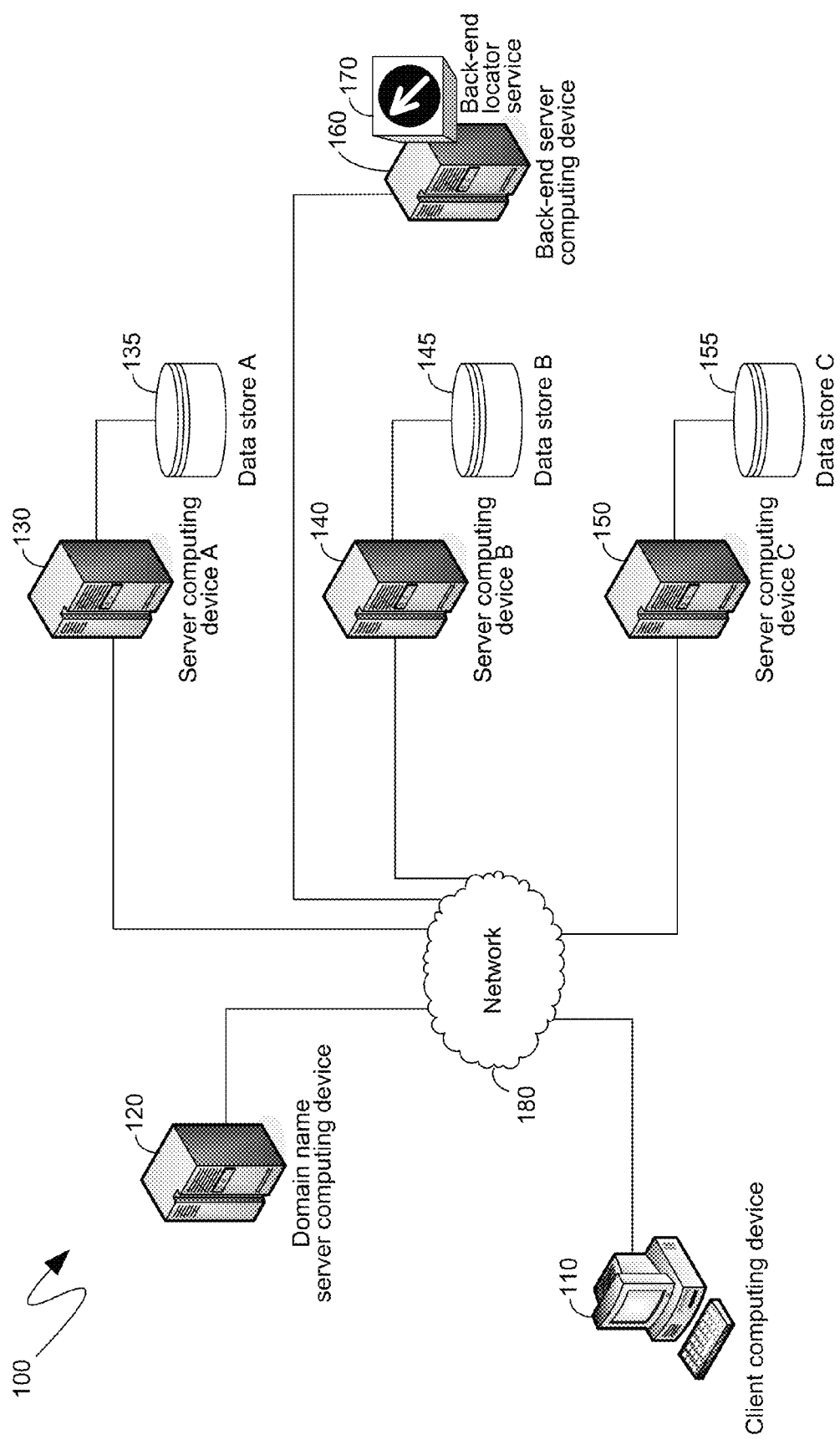
FIG. 1 is a block diagram of an exemplary system comprising a back-end locator service and data partitioned across multiple computing devices.

The following description relates to the efficient direction of network communications to a computing device most appropriate given the data requested by the network communications. A back-end locator service can provide location-specific network addresses of the computing device most appropriate for the requested data. The data requests can be part of a network-based application program interface that can be hierarchically defined, such that initial requests, in accordance with the network-based application program interface, can be location agnostic, while subsequent requests, again in accordance with the network-based application program interface, can be more specific and, as such can be directed, as part of the back-and-forth communications inherent in such a network-based application program interface, to the appropriate computing device.

While the below descriptions make reference to specific examples of network-based application program interfaces, and specific, known, networks, such as the Internet and the World Wide Web (WWW), the mechanisms described below are not so limited. Indeed, without change and as described, such mechanisms are equally applicable to any type of network-based application program interface and any type or implementation of a network of distributed computing devices. Thus, while the below descriptions will make reference to specific examples for the sake of descriptive clarity, the scope of the descriptions is not to be read so narrowly.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising computing devices that are communicationally coupled to one another via the network 180. In the illustrated embodiment, the computing devices communicationally coupled via the network 180 can comprise a client computing device 110 and multiple server computing devices, such as the server computing devices 130, 140 and 150. In one embodiment, the multiple server computing devices 130, 140 and 150 can each be communicationally coupled to a data store, such as the data stores 135, 145 and 155, that can each retain data that can be requested by, and utilized by, the client computing device 110. In addition, the system 100 shown in FIG. 1 can further comprise one or more back-end server computing devices, such as the backend server computing device 160, that can execute a back-end locator service 170. Although illustrated in system 100 of FIG. 1 as a single executing instance on a separate server computing device, in other embodiments, the back end locator service 170 can be implemented in individual instances executing on each of the server computing devices that are communicationally coupled to the data stores, such as the server computing devices 130, 140 and 150.

The system 100 of FIG. 1 additionally comprises one or more domain name server computing devices, such as the domain name server computing device 120. As will be known by those skilled in the art, such domain name server computing devices can provide translation services for the client computing device 110 whereby processes executing on the client computing device, such as a network browser, can provide a common, or colloquial, name for the server computing devices, and the domain name server computing device 120 can translate such a common name into a precise network address by which communications can be routed between the client computing device 110 and the one or more of the server computing devices 130, 140, or 150 whose network address was specified by the domain name server computing device 120. Typically, a domain name registration database can be updated by the entity responsible for managing the server computing devices 130, 140 and 150 to provide a linkage between a common name that is to be associated with one or more of those server computing devices and the precise network address to which communications directed to such a common name are to be sent.

In one embodiment, the server computing devices 130, 140, 150 and 160 can all work in tandem to provide data and services to client computing devices, such as the client computing device 110. For example, the server computing devices 130, 140, 150 and 160 can all be managed by, and directed by, a single entity directed to providing such services. One such service that can be provided to client computing devices, such as the client computing device 110, can be access to data and other resources through a network-based application program interface. In one embodiment, such an interface can be based on a REpresentational State Transfer (REST) architecture. As will be known by those skilled in the art, a REST architecture consists of clients and servers, where clients initiate requests to servers and servers process those requests and return responses. Additionally, the servers are not required to maintain a client context such that each request and response, in essence, can stand alone and the REST architecture can be considered to be "stateless".

As an example of a network-based application program interface that can be provided by the server computing devices 130, 140, 150 and 160, each of those server computing devices can be part of the same network domain, such as a single web domain on the World Wide Web. Such a domain can be generically identified by a top-level domain name, such as, for example, "www.someplace.com". The domain name server computing device 120 can provide the network address of any one of the server computing devices 130, 140, or 150 as the address to which requests directed to such a top-level domain name, such as from processes executing on the client computing device 110, should be directed. In response to such an initial request, and as part of the network-based application program interface, the server computing device to which such an initial response was directed can respond with a service document that can provide the calling process on the client computing device 110 with further options. For example, the options can include a list of the various namespaces, or types, of data that the processes executing on the client computing device can request more information about. A subsequent communication from the client computing device 110 can reference one of those options, such as, for example, by directing a request to "www.someplace.com/selected_option" and a response, from whichever one of the server computing devices 130, 140, or 150 receives that communication, can again provide another service document that can list further options relevant to the option referenced in the request. In such a manner, a back-and-forth between the client computing device 110 and one or more of the server computing devices 130, 140 and 150 can enable processes executing on the client computing device to ultimately select, request and edit specific data, or other information, that can be stored in the data stores 135, 145 and 155 associated with the server computing devices 130, 140 and 150, respectively. In such a manner, the server computing devices 130, 140 and 150 can provide a network-based application program interface.

Figure 2:
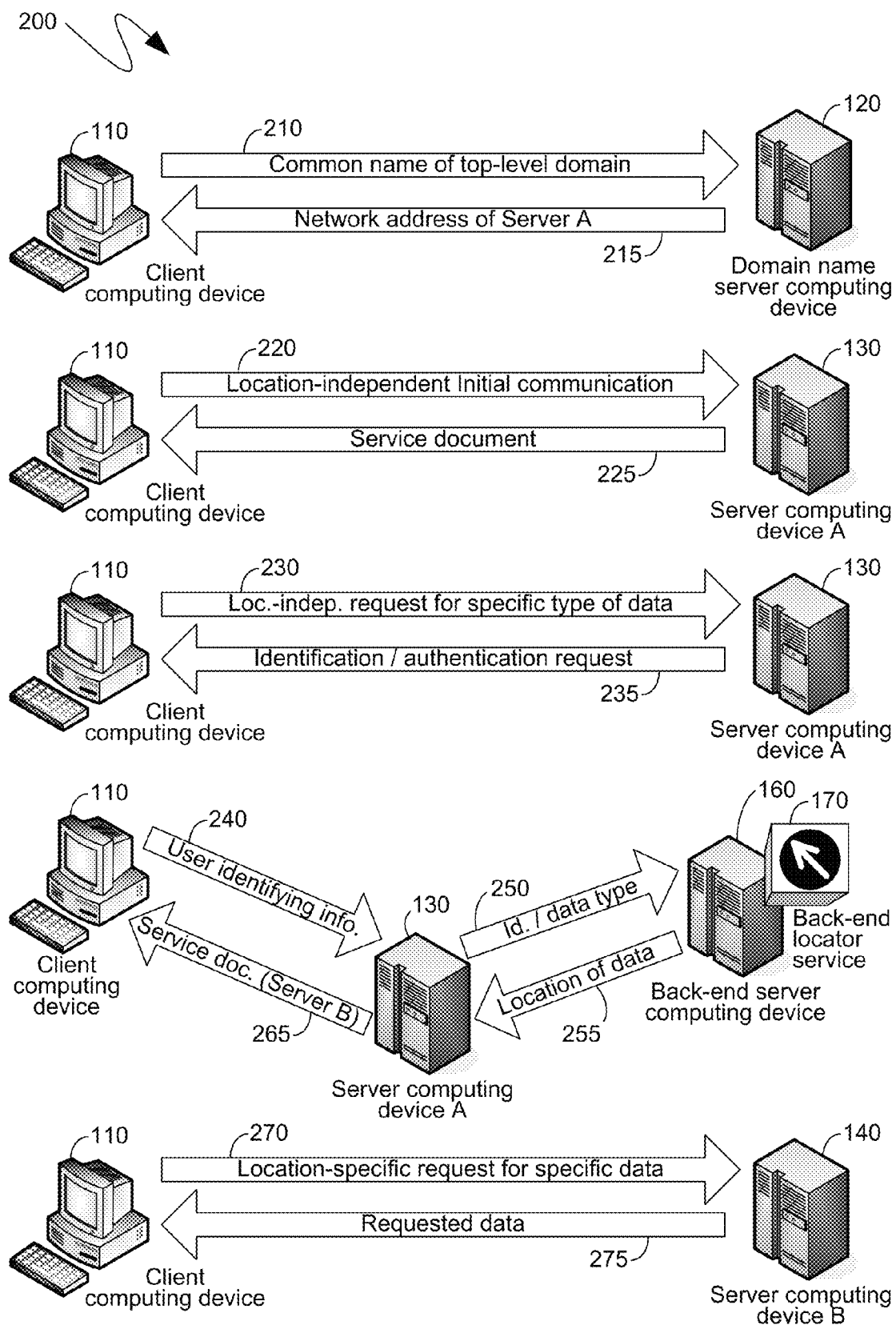
FIG. 2 is a block diagram of an exemplary communicational exchange efficiently directing requests to an appropriate computing device.

Turning to FIG. 2, the system 200 shown therein illustrates an exemplary series of network communications showing the utilization of a back-end locator service, such as the back-end locator service 170, in directing communications to an appropriate server computing device within the context of the network-based application program interface and without adding additional inefficiency. Initially, as described, processes executing on the client computing device 110 can initiate communication with the server computing devices 130, 140, or 150 by first directing a request to a top-level domain that is intended to act as a starting point for the utilization of the network-based application program interface. Thus, as shown in the system 200 of FIG. 2, the client computing device 110 can direct a communication 210 to the domain name server computing device 120 comprising a common name of the top-level domain associated with the server computing devices 130, 140 and 150. In response 215, the domain name server computing device 120 can return the network address of one or more of the server computing devices 130, 140 and 150. As will be known by those skilled in the art, the exact network address that is returned by the domain name server computing device 120 can be that associated with the top-level domain name in the domain name server database, such as by the entity managing that domain name. In some cases, the domain name server computing device 120 can apply some intelligence to the selection of the network address that it provides in the response 215. For example, the entity managing the domain name can specify, in the domain name server database, that the network address provided in response 215 is that of the server computing device, from among the server computing devices 130, 140 and 150, that is geographically, or physically, closest to the requesting client computing device 110. In such a case, the domain name server computing device 120 can identify an approximate location of the client computing device 110, such as from the network address of the client computing device, and can return, in the response 215, the network address of the server computing device that is closest to that location, from among the server computing devices 130, 140 and 150 that comprise the relevant domain. For purposes of illustration, in the system 200 of FIG. 2, the response 215 is shown as specifying the network address of the server computing device 130.

Consequently, the client computing device can then direct an initial communication 220 to the server computing device 130. As indicated in the system 200 of FIG. 2, initial communication 220 can be location-independent in that it need not specify a specific server computing device, but instead can merely specify that it was directed, generically, to the top level domain. For example, the communication 220 can simply indicate that it was directed to a web address of the form "www.somplace.com". In response to such a request, the server computing device 130 need not yet determine whether the client computing device 110 is requesting data that the server computing device 130 has access to, such as via the data store 135, shown previously in FIG. 1, to which the server computing device 130 is communicationally coupled. Instead, as shown in the system 200 of FIG. 2, the server computing device 130 can respond with a communication 225 comprising a service document that can list further options available to the client computing device 110. For example, the options in the service document provided with the response 225 can be in the form of more specific resource identifiers such as "www.someplace.com/option#1" and "www.someplace.com/option#2".

In one embodiment, the options identified by the service document returned with the response 225 can identify different types of data or data namespaces. For example, the domain supported by the server computing devices 130, 140 and 150 can provide access to either contact information, such as the names, phone numbers, e-mail addresses, and other like information of the contacts in a user's contact list, or synchronization information, such as the files being synchronized, the locations from which and to which such synchronization is occurring, and other like information of files that a user is synchronizing across the network 180 shown in FIG. 1. In such an embodiment, the service document returned with the response 225 can comprise a resource identifier of the form "www.someplace.com/sync" or "www.someplace.com/contacts".

Subsequently, upon receipt of the service document provided via the communication 225, the client computing device 110 can select one of the options enumerated in the service document and can return a request, selecting such an option, via the communication 230 provided to the server computing device 130, as shown in the system 200 of FIG. 2. Because much of the data that can be provided via the network-based application program interface can be user specific, at some point in time during the communications between the client computing device 110 and server computing devices associated with the network-based application program interface, the user on whose behalf the client computing device is utilizing the network-based application program interface will need to identify themselves. As will be known to those skilled in the art, such identification can take the form of identity information, authentication information, such as a password, and other like information. For purposes of illustration, in the system 200 of FIG. 2 the server computing device 130 is shown as requesting an identification/authentication, as part of a response 235 to the request 230 described above. Again, as indicated, the authentication of the identity of a user can be performed at any time prior to the requesting of user-specific data and its illustration in the system 200 of FIG. 2 is only meant to be exemplary.

Once authenticated, subsequent requests from such a user can include user identifying information. For example, during the authentication of the user, the client computing device 110 and the server computing device with which it is authenticating can establish a token, or other collection of data, that is to be included with each subsequent request to uniquely identify the user, at least for that communicational session. Irrespective of the exact mechanism, once the user has been authenticated, subsequent communications, such as the subsequent communication 240, from the client computing device 110 to a server computing device, such as the server computing device 130, can include such a token or other user-identifying information.

As part of the utilization of a network-based application program interface, the client computing device 110 can, at some point, request data that is sufficiently specific that the server computing device to which such a request is directed, such as the server computing device 130, may need to utilize a back-end locator service, such as the back-end locator service 170, to direct future such requests to a more appropriate server computing device. Returning to the above example, a service document, such as that provided via communication 225, can specify resource identifiers "www.someplace.com/sync" and "www.someplace.com/contacts" as the identifiers through which the client computing device 110 can request synchronization information or contact information. A subsequent request, such as the communication 240 from the client computing device 110 can, in addition to including a token, or other user identifier, also include one of those resource identifiers such as, for example, "www.someplace.com/sync". While the server computing device 130 to which such a communication 240 can be directed can still understand the basic structure of the synchronization data that can be accessed, the server computing device 130 can, in one embodiment, be communicationally coupled with a data store 135, as shown in FIG. 1, that does not comprise the relevant synchronization data, or, indeed, possibly any synchronization data at all. Instead, for example, synchronization data may be retained in the data store 145, which can be communicationally coupled to the server computing device 140, as shown in FIG. 1. In such an example, the server computing device 130, upon receiving the communication 240, can provide information to a back-end server computing device 160 to enable a back-end locator service 170 executing on such a computing device to identify a more appropriate computing device to which future communications regarding synchronization data are to be directed.

As shown in the system 200 of FIG. 2, upon receiving a communication 240, that can be directed to a type of data that the server computing device 130 does not have access to, the server computing device 130 can direct communication 250 to the back-end locator service 170 executing on a back-end server computing device 160. The communication 250 can comprise information that can be utilized by the back-end locator service 170 to identify a server computing device to which such requests are more appropriately directed. For example, if data is partitioned such that one type of data is stored in a data store associated with one server computing device and a different type of data is stored in a data store associated with the different computing device, then the communication 250 can comprise an identification of the type of data, or the namespace of the data, to which the communication 240 was directed. Alternatively, data can be partitioned such that one user's data is stored in a data store associated with one server computing device, while another user's data may be stored in the data store associated with a different server computing device. In such a case, the communication 250 can comprise an identification of the user that is seeking to access the data. As will be described further below, the back-end locator service 170 is agnostic as to the exact divisions of data among one or more data stores, so long as the back-end locator service is provided with the relevant information sufficient to determine which back-end store comprises the requested data.

As indicated previously, a back-end locator service, such as the back-end locator service 170, need not execute on a separate back-end server computing device, such as the back-end server computing device 160, and can instead execute on individual server computing devices, such as the server computing devices 130, 140 and 150. In such an embodiment, the communications 250 and 255 need not be anything more than inter-, or even intra-, process communications among one or more processes executing on the server computing device 130.

In the system 200 shown in FIG. 2, after receiving relevant information, via the communication 250, the back-end locator service 170 can identify the location of the data and a server computing device to which further requests for such data are to be directed. Such information can be contained in the communication 255 from the back-end server computing device 160 to the server computing device 130. The server computing device 130 can then respond, via the communication 265, to the client computing device 110, providing the client with yet another service document, except that the provided service document can specify the computing device identified by the back-end locator service 170. In the illustrated example shown in the system 200 of FIG. 2, the identified server computing device can be the server computing device 140. A further request, such as a request contained in the communication 270 can then be directed by the client computing device 110 to the server computing device 140 which can have access to the relevant data and provide the requested data via the response communication 275, as shown.

To provide more detail, and returning to the specific example enumerated previously, the communication 240 can be, for example, a selection, by the client computing device 110, of the "www.someplace.com/sync" resource identifier. In this example, data can be partitioned among the server computing devices 130, 140 and 150 such that the server computing device 130 is communicationally coupled to a data store 135 (shown in FIG. 1) that comprises contact data, while the server computing devices 140 and 150 are communicationally coupled to data stores 145 and 155, respectively, (also shown in FIG. 1) that comprise the synchronization data. Furthermore, the synchronization data can be partitioned such that specific users' synchronization data is maintained in the data store 145 while other users' synchronization data is maintained in the data store 155, both shown in FIG. 1.

In such an example, upon receiving the "www.someplace.com/sync" resource identifier in the communication 240 from the client computing device 110, the server computing device 130 can provide, via the communication 250, both an indication that subsequent requests will be directed to synchronization data, and an identification of the user whose synchronization data will be requested. The identification of synchronization data is the namespace of the data that will be requested and it can enable the back-end locator service 170 to determine that data stores 145 and 155, shown in FIG. 1, can be relevant. Additionally, an identification of the user can enable the back-end locator service to further narrow down and determine that, in the present example, the data store 145 can comprise the relevant data.

In the ensuing response 265, the server computing device 130 can provide a service document that, in accordance with the network-based application program interface described above, provides more detail regarding the synchronization data namespace. Such information can be generic to the namespace and, as such, can be provided by the server computing device 130 without needing to reference the server computing device 140. For example, the synchronization data namespace can be comprised of identifications of the files being synchronized, the locations of such files, the computing devices on which such files are being synchronized and other like synchronization information. As before, more specific resource identifiers can be provided to the client computing device 110 to enable the client computing device to subsequently select such more specific information. For example, the service document provided with the response 265 can include resource identifiers in the form of "www.someplace.com/sync/syncobjects" and "www.someplace.com/sync/devices".

However, since the server computing device 130 can have already received location-specific information, such as from the back-end locator service 170, such information can be included in the service document provided as part of the response 265. In one embodiment, resource identifiers can be modified to include the location specific-information, such as by pre-appending such information to the resource identifiers. In such an embodiment, a resource identifier of the form "www.somplace.com" can be a location-independent resource identifier, while the resource identifier of the form "server_B.someplace.com" can be a location-dependent resource identifier. Thus, the resource identifiers provided in the service document returned as part of the response 265 can be of the form "server_B.someplace.com/sync/syncobjects" and "server_B.someplace.com/sync/devices". Subsequent requests, such as the request 270, utilizing such location-dependent resource identifiers can be directed to the identified server computing device, such as the server computing device 140, as shown in the system 200 of FIG. 2.

As can be seen, the network-based application program interface can be structured such that initial requests are directed to a location-independent resource identifier, such as a top level domain name, and subsequent requests become more specific as subsequent responses provide service documents with increasing levels of specificity. Additionally, the data and resources exposed through the network-based application program interface can be hierarchical in nature such that specific data or resources are grouped into types, or namespaces, such that access to that data, or those resources, is obtained by first accessing the relevant type, or namespace.

Figure 3:
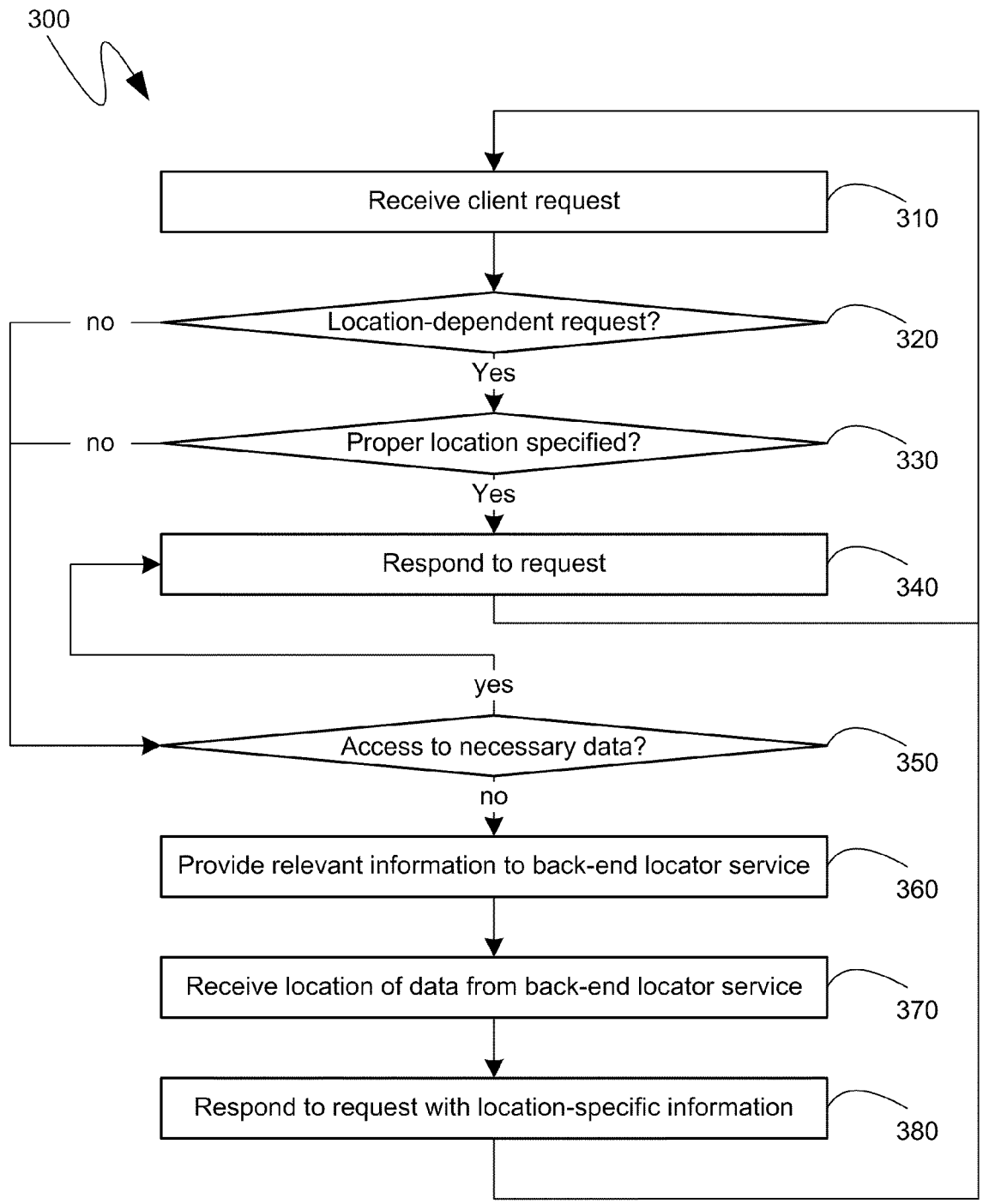
FIG. 3 is a flow diagram of an exemplary mechanism for utilizing a back-end locator service.

Turning to FIG. 3, the flow diagram 300 shown therein illustrates an exemplary series of steps that can be performed by a server computing device in determining when to reference a back-end locator service as part of the responses generated by such a server computing device within the context of a network-based application program interface. As shown in the flow diagram 300, upon receiving a client request at step 310, the server computing device can initially determine, at step 320, whether the request is a location-dependent or location-independent request. As indicated previously, initial requests are likely to be location-independent, such as requests directed to a top-level domain. Indeed, in one embodiment, it can be required of client application programs, such as those that can execute on a client computing device, that they not cache location-dependent resource locators and instead initiate each new utilization of the network-based application program interface with a location-independent resource locator such as a resource locator directed to a top-level domain.

If, at step 320, the server computing device determines that the request received from the client computing device is already location-dependent, then it is likely that such a request is the result of a series of requests and responses within an existing communicational cycle utilizing the network-based application program interface. Nevertheless, in an optional embodiment, the check can be made at step 330 to verify that the location-dependent request received at step 310 in fact specifies the proper location. More specifically, the check, at step 330, can verify the client did not improperly cache a location-dependent resource locator and simply reuse it in an inappropriate manner. If the proper location is specified, then the server computing device has been identified as the most appropriate server computing device to respond to the request was received at step 310 and, as a result, at step 340, the server computing device can respond to the client's request. Processing can then return to step 310 at which point a subsequent request from the client can be received.

If, however, at step 320 it is determined that the request received at step 310 is location-independent, then processing can proceed with step 350. Similarly, if it is determined, at step 320, that the request received at step 310 is location-dependent, but at step 330 is determined that an improper location is specified, then processing can again proceed with step 350. At step 350, a determination can be made as to whether the server computing device has access to the necessary data to which the requests, such as the request received at step 310, are directed. If it is determined, at step 350, that the server computing device does have access to the necessary data, processing can return to step 340 and the server computing device can respond to the request received at step 310.

If, at step 350, however, it is determined that the server computing device does not have access to the necessary data, a server computing device can provide relevant information to a back-end locator service at step 360. As indicated previously, the information provided to the back-end locator service at step 360 can depend on the manner in which the data is partitioned across different data stores communicationally coupled to a different server computing devices. The back-end locator service can be utilized irrespective of the type of partitioning employed, so long as the back-end locator service is provided with information regarding the partitioning that is employed. Thus, data can be partitioned in accordance with the type of data, or namespace of data, in accordance with the particular user with whom the data is associated, with combinations thereof, or in accordance with any other scheme. If, for example, the data is partitioned in accordance with the type, or namespace, of data, then the relevant information provided at step 360 can comprise the type, or namespace, of data to which the request received at step 310 is directed. Similarly, if the data is partitioned in accordance with the particular user with whom the data is associated, the relevant information provided at step 360 can comprise an identification of the user associated with the request received at step 310.

At step 370, location information can be received from the back-end locator service that can specify an appropriate location to which to direct future requests. Such information can then be incorporated into the response provided at step 380. For example, as described above, in one embodiment resource identifiers, such as would have been included in a service document provided as a response at step 380, can be modified to have location specific information pre-appended to them. Alternatively, the location information received at step 370 can be otherwise identified in the response provided at step 380. As in the case of step 340, once a response is provided, processing can return to step 310 at which point another client request can be received and the processing can repeat.

Figure 4:
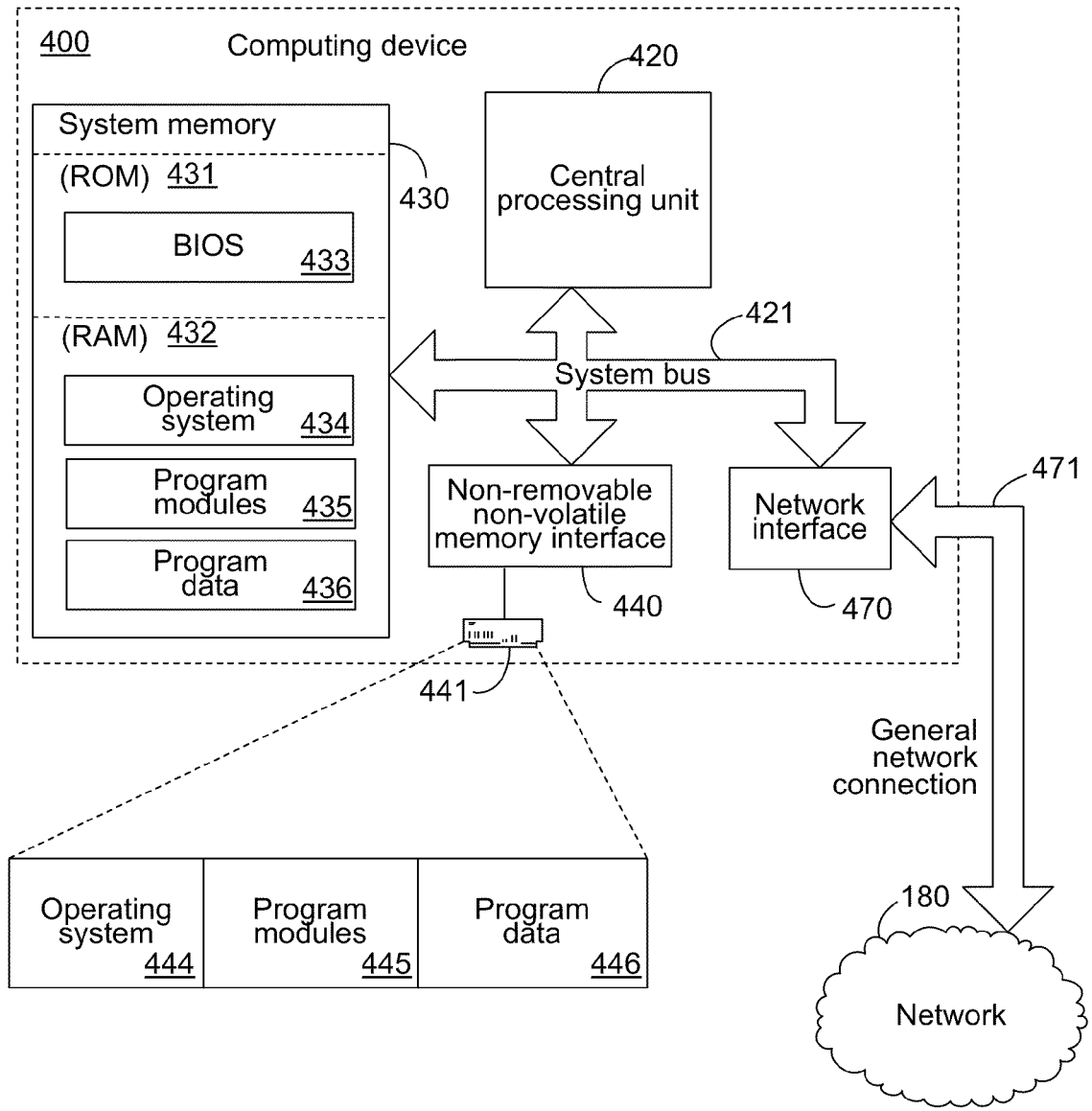
FIG. 4 is a block diagram of an exemplary computing device.

The above descriptions reference actions performed by computer-executable instructions executing on one or more computing devices. Turning to FIG. 4, one such exemplary computing device 400 is illustrated. Such an exemplary computing device 400 can be any one of the computing devices 110, 120, 130, 140, 150 or 160 described above and shown in FIG. 1, or any other like computing device.

The exemplary computing device 400 of FIG. 4 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

Additionally, the computing device 400 can operate in a networked environment using logical connections to one or more remote computers. For simplicity of illustration, the computing device 400 is shown in FIG. 4 to be connected to the network 180, originally illustrated in FIG. 1. The network 180 is not limited to any particular network or networking protocols. Instead, the logical connection depicted in FIG. 4 is a general network connection 471 that can be a local area network (LAN), a wide area network (WAN) or other network. The computing device 400 is connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for directing client communications to an appropriate computing device without incurring redirection inefficiencies have been provided. In view of the many possible variations of the subject matter described herein, we claim as our invention all such embodiments as may come within the scope of the following claims and equivalents thereto.

We claim:

1. A system for directing requests to a computing device that comprises resources relevant to responding to the requests, the system comprising:
    a first server computing device comprising a first set of resources;
    a second server computing device comprising a second set of resources that differ from the first set of resources;
    a domain exposing a network-based application program interface for accessing a domain set of resources comprising the first set of resources and the second set of resources through successively more specific requests utilizing the network-based application program interface; and
    a first back-end locator service for identifying one of the first server computing device or the second server computing device to receive subsequent requests directed to a specific resource from the domain set of resources, the first back-end locator service performing the identifying based on whether the specific resource is in the first or second set of resources;
    wherein both the first server computing device and the second server computing device can equally receive and respond to requests directed to a top-level of the domain;
    wherein the domain set of resources is accessed, at least in part, through resource identifiers, the resource identifiers having pre-appended to them identifications of the first server computing device or the second server computing device after the identifying by the first-back end locator service; and
    wherein the first server computing device invokes the first back-end locator service if the first server computing device receives a location-independent request directed to the second set of resources and the second server computing device invokes the first back-end locator service if the second server computing device receives a location-independent request directed to the first set of resources.

2. The system of claim 1, comprising a second back-end locator service for performing equivalent functions to the first back-end locator service, the first back-end locator service executing on the first server computing device and the second back-end locator service executing on the second server computing device.

3. The system of claim 1, wherein the resources comprise stored data.

4. The system of claim 1, wherein the first back-end locator service determines whether the specific resource is in the first or second set of resources based on a namespace of the specific resource.

5. The system of claim 1, wherein the first back-end locator service determines whether the specific resource is in the first or second set of resources based on a user associated with the specific resource.

6. A method of directing requests to a computing device that comprises resources relevant to responding to the requests, the method comprising the steps of:
   receiving successively more specific requests for resources, the successively more specific requests being in accordance with a network-based application program interface that is exposed by a domain, the successively more specific requests being location-independent;
   providing information to a back-end locator service to enable the back-end locator service to identify the computing device that comprises resources relevant to responding to the successively more specific requests; and
   responding, to at least one of the successively more specific requests for resources with a service document comprising location-dependent resource identifiers specifying the computing device identified by the back-end locator service;
   wherein the domain comprises multiple computing devices, each of which can equally receive and respond to requests directed to a top-level of the domain;
   wherein the location-dependent resource identifiers comprise location information pre-appended to location-independent resource identifiers; and
   wherein the providing the information to the back-end locator service is performed when a most recent of the successively more specific requests for resources is directed to resources available only from a different computing device.

7. The method of claim 6, wherein the resources comprise stored data.

8. The method of claim 6, wherein the information provided to the back-end locator service comprises a namespace of resources to which the successively more specific requests are directed.

9. The method of claim 6, wherein the information provided to the back-end locator service comprises an identification of a user to whose resources the successively more specific requests are directed.

10. One or more computer-readable storage media not consisting of a signal, the one or more computer-readable storage media having computer-executable instructions for directing requests to a computing device that comprises resources relevant to responding to the requests, the computer-executable instructions performing steps comprising:
    receiving successively more specific requests for resources, the successively more specific requests being in accordance with a network-based application program interface that is exposed by a domain, the successively more specific requests being location-independent;
    providing information to a back-end locator service to enable the back-end locator service to identify the computing device that comprises resources relevant to responding to the successively more specific requests; and
    responding, to at least one of the successively more specific requests for resources with a service document comprising location-dependent resource identifiers specifying the computing device identified by the back-end locator service;
    wherein the domain comprises multiple computing devices, each of which can equally receive and respond to requests directed to a top-level of the domain;
    wherein the location-dependent resource identifiers comprise location information pre-appended to location-independent resource identifiers; and
    wherein the computer-executable instructions directed to providing the information to the back-end locator service are executed when a most recent of the successively more specific requests for resources is directed to resources that are not available from a computing device comprising the computer-readable media.

11. The computer-readable storage media of claim 10, further comprising computer-executable instructions implementing the back-end locator service.

12. The computer-readable storage media of claim 10, wherein the resources comprise stored data.

13. The computer-readable storage media of claim 10, wherein the information provided to the back-end locator service comprises a namespace of resources to which the successively more specific requests are directed.

14. The computer-readable storage media of claim 10, wherein the information provided to the back-end locator service comprises an identification of a user to whose resources the successively more specific requests are directed.

* * * * *